United States Patent
Arora

(10) Patent No.: US 7,991,798 B2
(45) Date of Patent: Aug. 2, 2011

(54) IN PLACE MIGRATION WHEN CHANGING DATATYPE OF COLUMN

(75) Inventor: Geeta Arora, Union City, CA (US)

(73) Assignee: Oracle International Corporation, Redwood Shores, CA (US)

(*) Notice: Subject to any disclaimer, the term of this patent is extended or adjusted under 35 U.S.C. 154(b) by 50 days.

(21) Appl. No.: 11/444,571

(22) Filed: May 31, 2006

(65) Prior Publication Data

US 2007/0282515 A1 Dec. 6, 2007

(51) Int. Cl.
*G06F 17/30* (2006.01)
(52) U.S. Cl. .................................. 707/803; 707/601
(58) Field of Classification Search .................. None
See application file for complete search history.

(56) References Cited

U.S. PATENT DOCUMENTS

| | | |
|---|---|---|
| 5,227,967 A | 7/1993 | Bailey |
| 5,315,709 A | 5/1994 | Alston et al. |
| 5,440,743 A | 8/1995 | Yokota et al. ............... 710/200 |
| 5,448,727 A | 9/1995 | Annevelink ................. 707/101 |
| 5,555,388 A | 9/1996 | Shaughnessy ............... 711/100 |
| 5,608,903 A | 3/1997 | Prasad et al. ................. 707/10 |
| 5,640,550 A | 6/1997 | Coker |
| 5,717,924 A | 2/1998 | Kawai |
| 5,978,426 A | 11/1999 | Glover et al. ............... 375/376 |
| 6,016,497 A | 1/2000 | Suver ..................... 707/103 R |
| 6,122,630 A | 9/2000 | Strickler et al. ................ 707/8 |
| 6,122,640 A * | 9/2000 | Pereira .................. 707/103 R |
| 6,173,313 B1 | 1/2001 | Klots et al. ................ 709/203 |
| 6,268,850 B1 | 7/2001 | Ng ............................ 715/866 |
| 6,304,867 B1 | 10/2001 | Schmidt ......................... 707/2 |
| 6,324,535 B1 | 11/2001 | Bair et al. |
| 6,363,387 B1 | 3/2002 | Ponnekanti et al. .......... 707/10 |
| 6,460,055 B1 | 10/2002 | Midgley et al. ............. 707/204 |
| 6,480,848 B1 | 11/2002 | DeKimpe et al. |
| 6,519,613 B1 | 2/2003 | Friske et al. ............... 707/202 |
| 6,598,059 B1 | 7/2003 | Vasudevan et al. ......... 707/203 |
| 6,611,848 B1 | 8/2003 | Bradley ..................... 707/201 |
| 6,633,870 B1 | 10/2003 | Bradley ......................... 707/8 |
| 6,633,883 B2 | 10/2003 | Koskas ...................... 707/101 |
| 6,681,225 B1 | 1/2004 | Uceda-Sosa et al. ........... 707/8 |
| 6,745,209 B2 | 6/2004 | Holenstein et al. ......... 707/203 |
| 6,769,124 B1 | 7/2004 | Schoening et al. |
| 6,801,983 B2 | 10/2004 | Abe et al. .................... 711/130 |
| 6,834,290 B1 | 12/2004 | Pugh et al. ................. 707/205 |
| 2002/0087271 A1 * | 7/2002 | Rozenshtein et al. ........... 702/1 |

(Continued)

OTHER PUBLICATIONS

Paapanen, Eric, et al. Oracle Database Application Developer's Guide—Large Objects, 10g Release 1 (10.1) Part No. B10796-01(2003) Apr. 21, 2008 <http://www.stanford.edu/dept/itss/docs/oracle/10g/appdev.101/b10796.pdf>.*

(Continued)

*Primary Examiner* — Mohammad Ali
*Assistant Examiner* — Syed H Hasan
(74) *Attorney, Agent, or Firm* — Hickman Palermo Truong & Becker LLP

(57) ABSTRACT

Techniques are described herein for altering the datatype of a column without having to immediately migrate the data items that currently reside in the column. In one embodiment, the alteration is performed without migration by creating a new column having the desired datatype while retaining the old column. Instead of migrating the data items from to the new column at the time the column is altered, the items remain in the original column until the items are updated.

22 Claims, 3 Drawing Sheets

U.S. PATENT DOCUMENTS

| | | | |
|---|---|---|---|
| 2002/0188600 A1* | 12/2002 | Lindsay et al. | 707/3 |
| 2003/0154216 A1 | 8/2003 | Arnold et al. | |
| 2003/0217069 A1 | 11/2003 | Fagin et al. | |
| 2003/0229610 A1 | 12/2003 | Van Treeck | |
| 2004/0064487 A1* | 4/2004 | Nguyen et al. | 707/204 |
| 2006/0015528 A1 | 1/2006 | Hejlsberg et al. | |
| 2006/0085457 A1 | 4/2006 | Gelfand | |
| 2007/0038651 A1 | 2/2007 | Bernstein et al. | |
| 2007/0079140 A1* | 4/2007 | Metzger et al. | 713/189 |
| 2007/0219951 A1 | 9/2007 | Ahmed et al. | |

OTHER PUBLICATIONS

Smith, Jeff. "The shortest, fastest, and easiest way to compare two tables in SQL Server: UNION!" Jeff's SQL Server Blog. Nov. 10, 2004. Apr. 22, 2008 <http://weblogs.sqlteam.com/jeffs/archive/2004/11/10/2737.aspx>.*

T-SQL, "sp_rename (T-SQL)." Mar. 27, 2003 Apr. 22, 2008 <http://web.archive.org/web/20030327184148/http://doc.ddart.net/mssql/sql70/sp_ra-rz_11.htm>.*

Davidson, Tom. "Managing Schema Changes (Part 2)." MSSQL Server Development Customer Advisory Team. Mar. 31, 2006. Microsoft Corporation. Nov. 19, 2008 <http://blogs.msdn.com/sqlcat/archive/2006/03/31/566046.aspx>.*

Ambler, Scott, and Pramod Sadalage. Refactoring Databases: Evolutionary Database Design. Mar. 3, 2006.*

Date, C.J., et al., "A Guide to SQL/DS", Codd and Date Consulting Group, Addison-Wesley Publishing Company, Printed Feb. 1989, 13 pages.

Lassen, Allen R., "Experiences With Object Oriented Development in PL/SQL", Centre for Object Technology, Copyright 2000, COT/4-18-v1.4, 27 pages.

Oracle, "Object Cache Navigation", Copyright 1996, 2002 Oracle Corporation, Oracle Call Interface Programmer's Guide, Release 2 (9.2), Part No. A96584-01, 18 pages.

Quest, "Reorganization for the 24x7 Database", Quest Software, Inc., LiveReorg®, 2001, 4 pages.

U.S. Appl. No. 11/201,797, filed Aug. 10, 2005, Final Office Action, Dec. 7, 2010.

U.S. Appl. No. 11/875,478, filed Oct. 19, 2007, Office Action, Aug. 30, 2010.

Scott Ambler et al., "Refactoring Databases: Evolutionary Database Design", Mar. 3, 2006, 7 pages.

Tom Davidson, Managing Schema Changes (Part 2), MSSQL Server Development Customer Advisory Teach, Mar. 31, 2006, Microsoft Corporation, Nov. 19, 2000, http://blgs.msdn.com/squlcat/archive/2006/03/31/566046.aspx, 11 pages.

U.S. Appl. No. 11/801,495, filed May 9, 2007, Office Action, mailing date Jun. 3, 2011.

* cited by examiner

IN PLACE MIGRATION WHEN CHANGING DATATYPE OF COLUMN

FIELD OF THE INVENTION

The present invention relates to data containers and, more specifically, to commands that alter the datatype of a column of a table.

BACKGROUND

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

It is not uncommon to want to make changes to a data container, such as a relational table, after the container has been in use for a while. For example, a relational table may be created with a column X for storing a certain type of data (the "original datatype"). After the table has been in use for a while, a user may want to modify the table to allow column X to store a different type of data (the "new datatype").

Unfortunately, simply modifying the definition of the table may be insufficient to make such changes, because the new datatype may have a different storage format than the original datatype. Consequently, the "target column" (in this case, column X) may not have the right amount of storage for the new datatype. Therefore, the old column needs to be replaced with a new column with the appropriate amount of storage.

However, creating a new column may also not be enough, since the original column may already contain stored data items that are formatted according to the original datatype. Therefore, in addition to changing the definition of the table and creating a new column, the data items in the original column have to be converted to the format of the new datatype, and then stored into the new column. Once all of the data from the target column has been migrated to the newly-created column, the original column may be dropped.

The bulk migration of target column data items may be accomplished, for example, by issuing a Recursive Procedure Invocation (a recursive SQL call). Unfortunately, the bulk migration of the data items that exist in the target column can take an unacceptably long time, especially for tables that contain millions of rows. Further, the conversion may cause row-chaining and non-locality of data storage.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Overview

Techniques are described herein for altering the datatype of a column without having to immediately migrate the data items that currently reside in the column. In one embodiment, the alteration is performed without migration by creating a new column having the desired datatype while retaining the old column. Instead of migrating the data items from to the new column at the time the column is altered, the items remain in the original column until the items are updated.

Data manipulation language (DML) operations performed against the column are handled in a special manner. For example, when the data items are updated, the data items are migrated to the new column. When new items are inserted, they are inserted into the new column. When items are selected, the new column is first checked. If the new column is NULL, then the old column is checked.

Alternative embodiments are described in which the old column is checked first. In addition, techniques are provided for performing scheduled migrations of items from the old column to the new column. Once all of the items have been migrated to the new column, the old column may be dropped, and the special handling of DML operations may stop.

Example Conversion Operation

Figure 1:
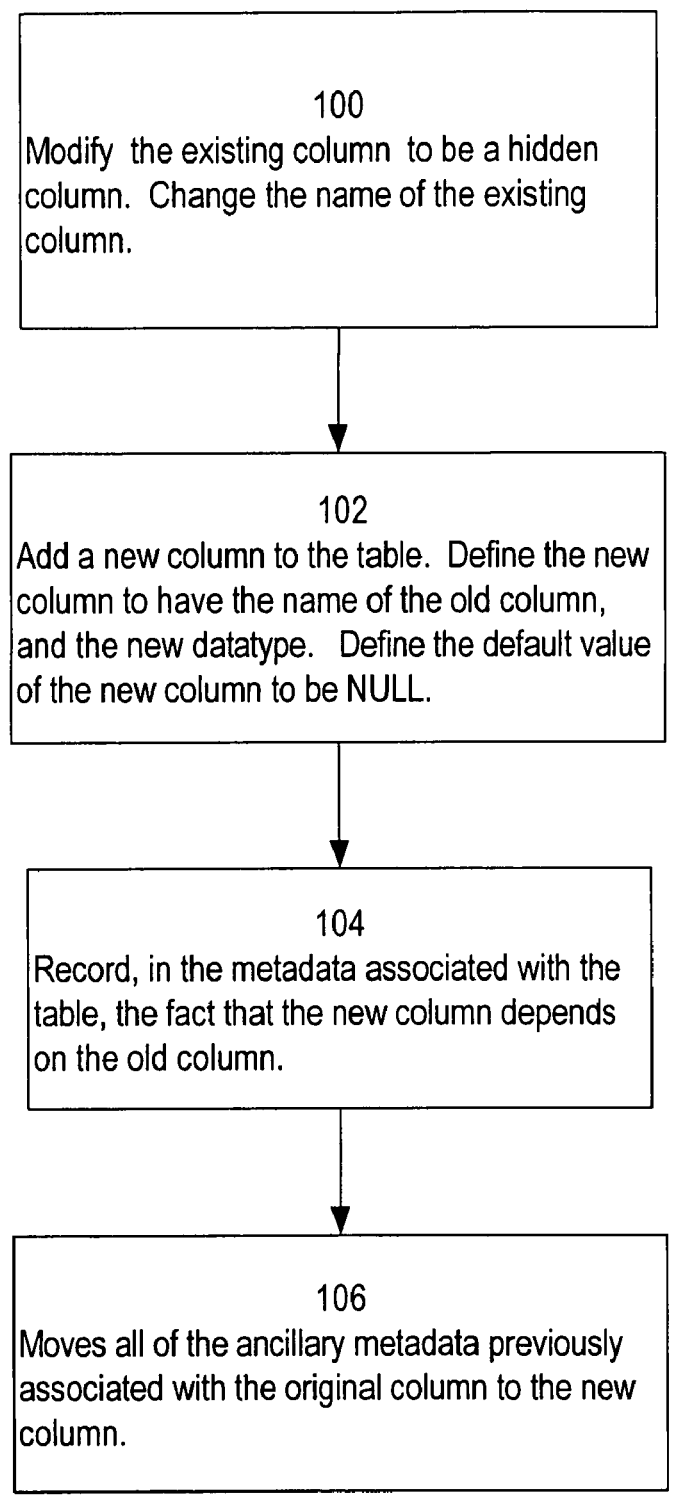
FIG. 1 is a flowchart illustrating steps performed in response to a command that changes the datatype of a column, according to an embodiment of the invention.

For the purpose of explanation, assume that the target column is column target_col in table t. Further assume that the original datatype of target_col is datatype1. Thus, the following command may have been used to create table t:

CREATE TABLE t (target_col <datatype1>);

After table t has been in use for a while, a user may decide to change the datatype of target_col to datatype2. The user may initiate this conversion by issuing the command:

ALTER TABLE t MODIFY (target_col <datatype2>);

In response to receiving this alter statement, the database server performs the metadata operations illustrated in FIG. 1. Significantly, none of the operations involve the movement or conversion of exiting data items.

Referring to FIG. 1, in step 100, the existing column "target_col" is modified to be a hidden column, and its name is changed. For the purpose of explanation, it shall be assumed that the name is changed to SYS_NC. Control then proceeds to step 102.

In step 102, a new column is added to table T. The new column is defined as "target_col <datatype2>" with default value NULL. Thus, the new column has the original name of the old column, but is defined to store data items of the new datatype.

According to one embodiment, the storage for values for new column is added to the end of the storage for table T, so the database server does not actually have to access all of the existing rows to add the NULL value for the new column. Control proceeds form step 102 to step 104.

At step 104, the database server records, in the metadata associated with table t, the fact that the new column "target_col" depends on the old column "sys_nc". For the purpose of discussion, the "sys_nc" column shall be referred to herein as the "sister column" of "target_col". Control then proceeds to step 106.

At step 106, the database server moves all of the ancillary metadata previously associated with the original column to the new column. Such ancillary metadata may include, for example, triggers, constraints, default values, etc. that had previously been defined for the original column.

Post-Conversion DML Operations

Figure 2:
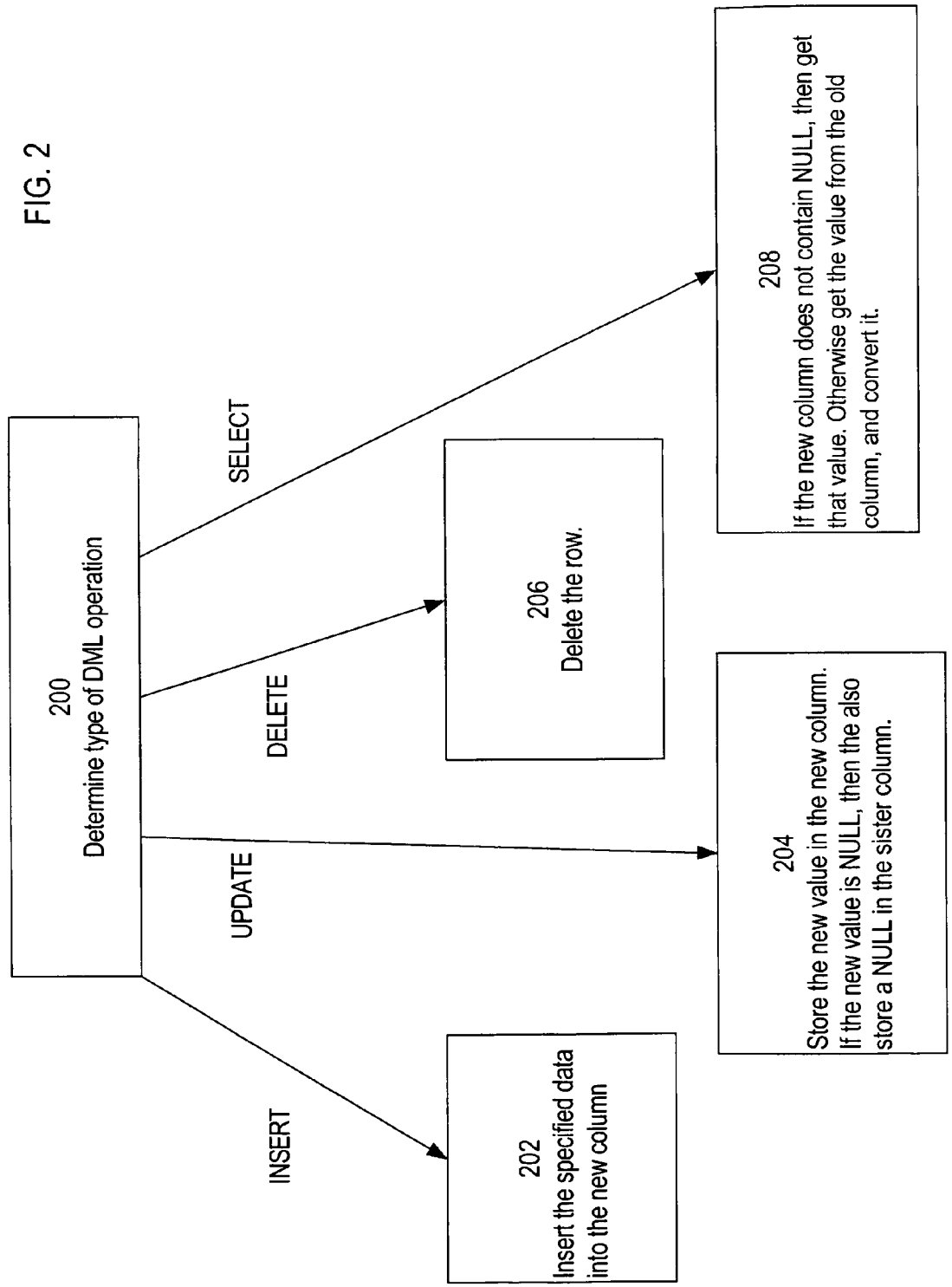
FIG. 2 is a flowchart illustrating steps performed in response to a DML command that targets a table that includes a column whose datatype has been changed, according to an embodiment of the invention.

DML operations have to be performed differently after the column of a table has been converted using the technique described above. Specifically, after the conversion, the data item for the target column may reside in the old column (sys_nc) for some rows, and in the new column (target_col) for other rows. FIG. 2 is a flowchart showing how the database server may process DML operations after such a conversion, according to an embodiment of the invention.

Control begins at step 200, where the database server determines whether the DML operation is an INSERT operation, an UPDATE operation, a DELETE operation or a SELECT operation.

If the DML operation is an INSERT operation, then control proceeds to step 202, where the database server inserts the specified data into the new column "target_col".

If the DML operation is an UPDATE operation, then control proceeds to step 204, where the database server stores the new value in the new column "target_col". If the new value is NULL, then the database server also stores a NULL in the sister column sys_nc.

If the DML operation is a DELETE operation, then control proceeds to step 206, where the database server deletes the row (including the values in both the target_col and sys_nc).

Finally, if the DML operation is a SELECT, then control proceeds to step 208, where the database server modifies the select logic to do the following: If "target_col" is not NULL, then get that value, otherwise get the value from the sister column "sys_nc". Data items retrieved from the sister column will reflect the format of the old datatype. Consequently, the database server may have to perform a format conversion operation on them to conform them to the new datatype.

By processing DML operations in this manner, all new data items for the target column are placed in the new column, and data items that existed in the target column before the conversion are gradually "migrated" from the old column to the new column in response to being updated.

Scheduled Migration

The overhead of migrating data from the old column in a single bulk migration may be unacceptably large, as explained above. However, there are benefits to achieving a state in which all of the data items from the original column have been migrated. For example, if it is known that all of the data items from the original column have been migrated, the original column may be dropped, and the special handling of DML operations may be discontinued.

To achieve a fully-migrated state without incurring the overhead of a single bulk migration, a phased migration plan may be used. For example, a user can issue an UPDATE command against a certain range of rows within the table. The UPDATE command may do nothing more than assign to the target column the values that are already in the target column (e.g. UPDATE target_col TO target_col). The data items in the target column of every row touched by this update will be migrated from the old column to the new column, if they have not already been migrated.

Such "scheduled migration queries" may be executed during convenient times, such as late at night when their execution will not have a significant impact on the operation of the system. After the data items from all rows have been migrated to the new column in this fashion, the old column and special DML handling may be dropped.

According to one embodiment, NULLs are stored in the old column in response to any UPDATE, not just UPDATES to NULL. In such an embodiment, the rows that need to be migrated to the new column are easily identified, since they will be the only rows that have non-null values in the old column. Therefore, the absence of non-null values in the old column may be used as a trigger for dropping the old column, and ceasing to perform the special handling of DML operations that involve the target column.

Variations

In the foregoing description, specific details are described relative to certain embodiments. However, the techniques described herein are not limited to those specific details. For example, step 208 describes an embodiment in which a SELECT operation is performed by first checking the new column and, if it contains a null, checking the old column. However, in an alternative embodiment, the database server (1) always stores a NULL in the old column when a data item is updated, and (2) performs a SELECT operation by first checking the old column. If the old column contains a NULL, then the database server checks the new column.

This alternative embodiment has the advantage that the data items from the old column are more likely to be located near (e.g. on the same disk block as) the rest of the data items in the row (assuming that the old column was allocated at the time the table was created). Consequently, the old column may be accessed more efficiently than the new column, increasing performance in the cases where the old column contains non-null values.

Over time, the number of null values in the old column will increase, since null values are stored in the old column whenever a data item is updated. Consequently, at some point the decreased likelihood of finding a non-null value in the old column may make it inefficient to check the old column before checking the new column. Upon detecting that the number of non-null values in the old column has fallen below a certain threshold, the database server may switch to checking the new column first.

Hardware Overview

Figure 3:
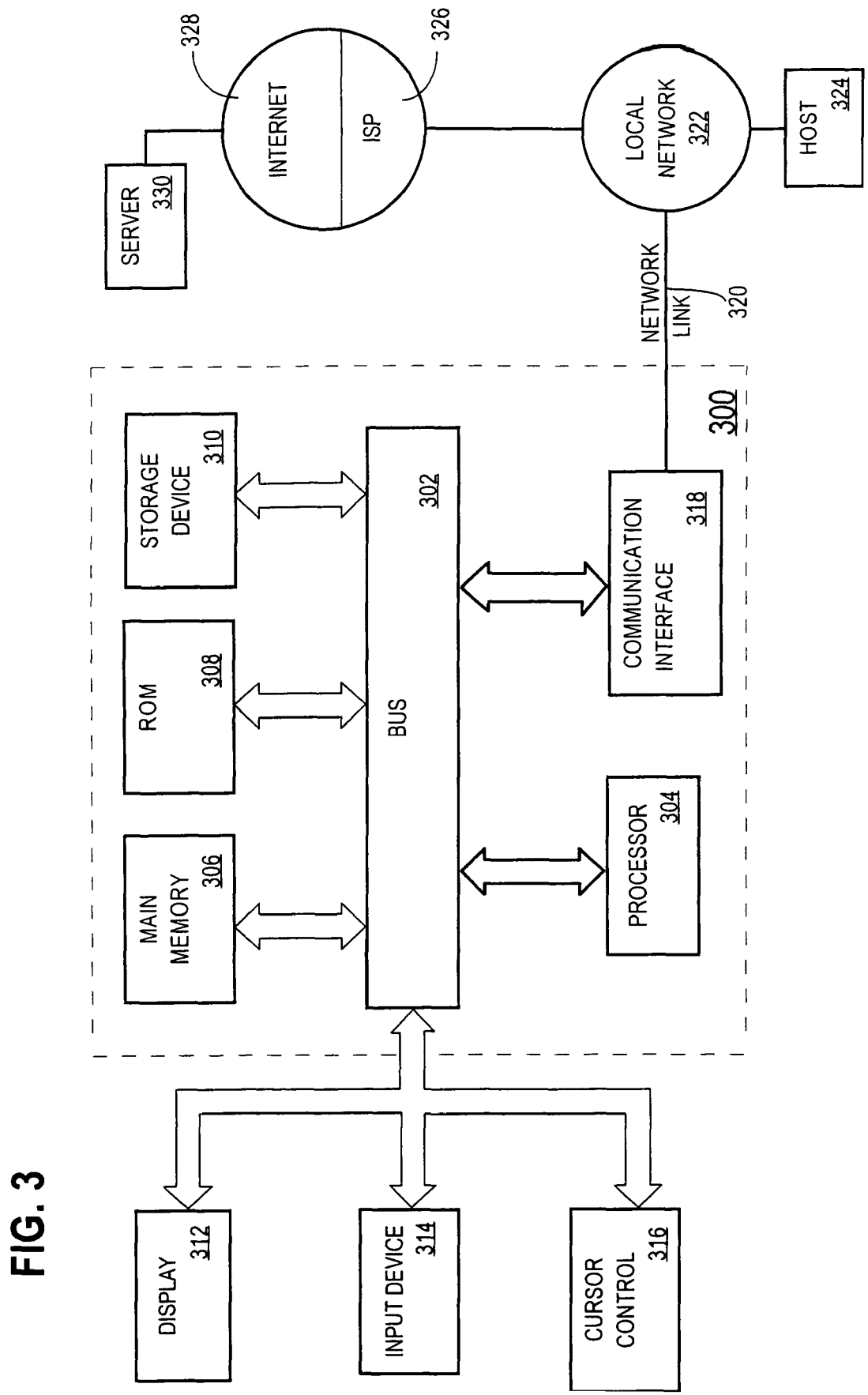
FIG. 3 is a block diagram of a computer system upon which embodiments of the invention may be implemented.

FIG. 3 is a block diagram that illustrates a computer system 300 upon which an embodiment of the invention may be implemented. Computer system 300 includes a bus 302 or other communication mechanism for communicating information, and a processor 304 coupled with bus 302 for processing information. Computer system 300 also includes a main memory 306, such as a random access memory (RAM) or other dynamic storage device, coupled to bus 302 for storing information and instructions to be executed by processor 304. Main memory 306 also may be used for storing temporary variables or other intermediate information during execution of instructions to be executed by processor 304. Computer system 300 further includes a read only memory (ROM) 308 or other static storage device coupled to bus 302 for storing static information and instructions for processor 304. A storage device 310, such as a magnetic disk or optical disk, is provided and coupled to bus 302 for storing information and instructions.

Computer system 300 may be coupled via bus 302 to a display 312, such as a cathode ray tube (CRT), for displaying information to a computer user. An input device 314, including alphanumeric and other keys, is coupled to bus 302 for communicating information and command selections to processor 304. Another type of user input device is cursor control 316, such as a mouse, a trackball, or cursor direction keys for communicating direction information and command selections to processor 304 and for controlling cursor movement on display 312. This input device typically has two degrees of freedom in two axes, a first axis (e.g., x) and a second axis (e.g., y), that allows the device to specify positions in a plane.

The invention is related to the use of computer system 300 for implementing the techniques described herein. According to one embodiment of the invention, those techniques are performed by computer system 300 in response to processor 304 executing one or more sequences of one or more instructions contained in main memory 306. Such instructions may be read into main memory 306 from another machine-readable medium, such as storage device 310. Execution of the sequences of instructions contained in main memory 306 causes processor 304 to perform the process steps described herein. In alternative embodiments, hard-wired circuitry may be used in place of or in combination with software instructions to implement the invention. Thus, embodiments of the invention are not limited to any specific combination of hardware circuitry and software.

The term "machine-readable medium" as used herein refers to any medium that participates in providing data that causes a machine to operation in a specific fashion. In an embodiment implemented using computer system 300, various machine-readable media are involved, for example, in providing instructions to processor 304 for execution. Such a medium may take many forms, including but not limited to, non-volatile media, volatile media, and transmission media. Non-volatile media includes, for example, optical or magnetic disks, such as storage device 310. Volatile media includes dynamic memory, such as main memory 306. Transmission media includes coaxial cables, copper wire and fiber optics, including the wires that comprise bus 302. Transmission media can also take the form of acoustic or light waves, such as those generated during radio-wave and infra-red data communications. All such media must be tangible to enable the instructions carried by the media to be detected by a physical mechanism that reads the instructions into a machine.

Common forms of machine-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of machine-readable media may be involved in carrying one or more sequences of one or more instructions to processor 304 for execution. For example, the instructions may initially be carried on a magnetic disk of a remote computer. The remote computer can load the instructions into its dynamic memory and send the instructions over a telephone line using a modem. A modem local to computer system 300 can receive the data on the telephone line and use an infra-red transmitter to convert the data to an infra-red signal. An infra-red detector can receive the data carried in the infra-red signal and appropriate circuitry can place the data on bus 302. Bus 302 carries the data to main memory 306, from which processor 304 retrieves and executes the instructions. The instructions received by main memory 306 may optionally be stored on storage device 310 either before or after execution by processor 304.

Computer system 300 also includes a communication interface 318 coupled to bus 302. Communication interface 318 provides a two-way data communication coupling to a network link 320 that is connected to a local network 322. For example, communication interface 318 may be an integrated services digital network (ISDN) card or a modem to provide a data communication connection to a corresponding type of telephone line. As another example, communication interface 318 may be a local area network (LAN) card to provide a data communication connection to a compatible LAN. Wireless links may also be implemented. In any such implementation, communication interface 318 sends and receives electrical, electromagnetic or optical signals that carry digital data streams representing various types of information.

Network link 320 typically provides data communication through one or more networks to other data devices. For example, network link 320 may provide a connection through local network 322 to a host computer 324 or to data equipment operated by an Internet Service Provider (ISP) 326. ISP 326 in turn provides data communication services through the world wide packet data communication network now commonly referred to as the "Internet" 328. Local network 322 and Internet 328 both use electrical, electromagnetic or optical signals that carry digital data streams. The signals through the various networks and the signals on network link 320 and through communication interface 318, which carry the digital data to and from computer system 300, are exemplary forms of carrier waves transporting the information.

Computer system 300 can send messages and receive data, including program code, through the network(s), network link 320 and communication interface 318. In the Internet example, a server 330 might transmit a requested code for an application program through Internet 328, ISP 326, local network 322 and communication interface 318.

The received code may be executed by processor 304 as it is received, and/or stored in storage device 310, or other non-volatile storage for later execution. In this manner, computer system 300 may obtain application code in the form of a carrier wave.

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A computer-implemented method, comprising:
   receiving a first command to change the datatype associated with a first column of a table from a first datatype to a second datatype, wherein the first column is associated with a first column name;
   in response to the first command to change the datatype, (1) creating a second column of the table for storing items associated with the second datatype, and (2) associating said second column with said first column name, without having migrated all values residing in the first column from said first column to said second column;

without having migrated all values residing in the first column from said first column to said second column:
  storing a new value in said second column;
  in response to a second command that requests a value by referring to the first column name, retrieving said new value from the second column;
  in response to a third command that requests a value by referring to the first column name, retrieving a second value from the first column and converting said second value to said second datatype;

wherein the method is performed by one or more computing devices.

2. The method of claim 1, further comprising:
responding to a command to insert a specified data item into the column identified by the first name by inserting the specified data item into the second column.

3. The method of claim 2, further comprising:
in response to a request to retrieve data from the column identified by the first name:
  retrieving a second data item from the first column;
  converting the second data item to the new datatype to generate a modified item; and
  returning the modified item.

4. The method of claim 1, further comprising:
responding to a fourth command to update the value of a particular item by storing a NULL value in the first column in addition to storing an updated value of the particular item in the second column.

5. The method of claim 4, further comprising:
responding to a command that requests data from the column identified by the first name by checking the second column for data, and if the second column contains a NULL value, then checking the first column for data.

6. The method of claim 4 wherein, further comprising:
responding to a command that requests data from the column identified by the first name by checking the first column for data, and if the first column contains a NULL, then checking the second column for data.

7. The method of claim 4, further comprising:
determining that all items have been migrated from said first column by determining that no non-null values remain in said first column.

8. The method of claim 1 further comprising migrating a particular item from the first column to said second column by converting the format of the particular item from a format dictated by the first datatype to a format dictated by the second datatype.

9. The method of claim 1, further comprising:
executing a series of update statements, wherein each update statement in said series of update statements causes items from said table to be migrated from said first column to said second column without changing values represented by said items.

10. The method of claim 1, further comprising:
dropping said first column after all items have been migrated from said first column to said second column; and
after dropping said first column, responding to a SELECT operation by checking the second column for data, and if the second column contains a NULL for a particular row, determining that the particular row contains a NULL without checking the first column for data.

11. The method of claim 1, wherein the steps of (1) creating a second column of the table for storing items associated with the second datatype, and (2) associating said second column with said first column name are performed without first migrating any values from said first column to said second column.

12. A machine-readable volatile or non-volatile storage medium storing one or more sequences of instructions which, when executed by one or more processors, causes the one or more processors to perform:
  receiving a first command to change the datatype associated with a first column of a table from a first datatype to a second datatype, wherein the first column is associated with a first column name;
  in response to the first command to change the datatype, (1) creating a second column of the table for storing items associated with the second datatype, and (2) associating said second column with said first column name, without having migrated all values residing in the first column from said first column to said second column;
  without having migrated all values residing in the first column from said first column to said second column:
    storing a new value in said second column;
    in response to a second command that requests a value by referring to the first column name, retrieving said new value from the second column;
    in response to a third command that requests a value by referring to the first column name, retrieving a second value from the first column and converting said second value to said second datatype.

13. The machine-readable volatile or non-volatile storage medium of claim 12, wherein the instructions further include instructions for:
responding to a command to insert a specified data item into the column identified by the first name by inserting the specified data item into the second column.

14. The machine-readable volatile or non-volatile storage medium of claim 13, wherein the instructions further include instructions for:
in response to a request to retrieve data from the column identified by the first name:
  retrieving a second data item from the first column;
  converting the second data item to the new datatype to generate a modified item; and
  returning the modified item.

15. The machine-readable volatile or non-volatile storage medium of claim 12, wherein the instructions further include instructions for:
responding to a fourth command to update the value of a particular item by storing a NULL value in the first column in addition to storing an updated value of the particular item in the second column.

16. The machine-readable volatile or non-volatile storage medium of claim 15, wherein the instructions further include instructions for:
responding to a command that requests data from the column identified by the first name by checking the second column for data, and if the second column contains a NULL value, then checking the first column for data.

17. The machine-readable volatile or non-volatile storage medium of claim 15, wherein the instructions further include instructions for:
responding to a command that requests data from the column identified by the first name by checking the first column for data, and if the first column contains a NULL, then checking the second column for data.

18. The machine-readable volatile or non-volatile storage medium of claim 15, wherein the instructions further include instructions for:

determining that all items have been migrated from said first column by determining that no non-null values remain in said first column.

19. The machine-readable volatile or non-volatile storage medium of claim 12, wherein the instructions further include instructions for:
migrating a particular item from the first column to said second column by converting the format of the particular item from a format dictated by the first datatype to a format dictated by the second datatype.

20. The machine-readable volatile or non-volatile storage medium of claim 12, wherein the instructions further include instructions for:
executing a series of update statements, wherein each update statement in said series of update statements causes items from said table to be migrated from said first column to said second column without changing values represented by said items.

21. The machine-readable volatile or non-volatile storage medium of claim 12, wherein the instructions further include instructions for:
dropping said first column after all items have been migrated from said first column to said second column; and
after dropping said first column, responding to a SELECT operation by checking the second column for data, and if the second column contains a NULL for a particular row, determining that the particular row contains a NULL without checking the first column for data.

22. The machine-readable volatile or non-volatile storage medium of claim 12, wherein the steps of (1) creating a second column of the table for storing items associated with the second datatype, and (2) associating said second column with said first column name are performed without first migrating any values from said first column to said second column.

* * * * *

UNITED STATES PATENT AND TRADEMARK OFFICE
CERTIFICATE OF CORRECTION

| | | |
|---|---|---|
| PATENT NO. | : 7,991,798 B2 | Page 1 of 1 |
| APPLICATION NO. | : 11/444571 | |
| DATED | : August 2, 2011 | |
| INVENTOR(S) | : Arora | |

It is certified that error appears in the above-identified patent and that said Letters Patent is hereby corrected as shown below:

In the Drawing,
On sheet 2 of 3, in figure 2, Reference Numeral 204, line 2, after "then the" insert -- database server --.

In column 2, line 61, delete "form" and insert -- from --, therefor.

Signed and Sealed this
Twenty-ninth Day of November, 2011

David J. Kappos
*Director of the United States Patent and Trademark Office*